United States Patent
Dal Zotto

(10) Patent No.: US 12,405,902 B2
(45) Date of Patent: Sep. 2, 2025

(54) CONFIGURATION PROFILES

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 18/701,155

(22) PCT Filed: Oct. 22, 2021

(86) PCT No.: PCT/US2021/056163
§ 371 (c)(1),
(2) Date: Apr. 12, 2024

(87) PCT Pub. No.: WO2023/069110
PCT Pub. Date: Apr. 27, 2023

(65) Prior Publication Data
US 2025/0004953 A1    Jan. 2, 2025

(51) Int. Cl.
*G06F 13/10*    (2006.01)
(52) U.S. Cl.
CPC ................... *G06F 13/10* (2013.01)

(58) Field of Classification Search
CPC .............................. G06F 13/10; G06V 10/255
See application file for complete search history.

(56) References Cited

U.S. PATENT DOCUMENTS

| | | | |
|---|---|---|---|
| 10,303,961 B1 * | 5/2019 | Stoffel | H04W 4/44 |
| 2017/0205237 A1 * | 7/2017 | White | G01C 21/206 |
| 2017/0316196 A1 | 11/2017 | Smith | |
| 2020/0294244 A1 * | 9/2020 | Diankov | G06Q 10/087 |
| 2021/0072764 A1 * | 3/2021 | Kean | G06V 10/255 |
| 2021/0174371 A1 * | 6/2021 | Yoffe | G06F 11/325 |

FOREIGN PATENT DOCUMENTS

DE    102013102272 A1    9/2014

* cited by examiner

*Primary Examiner* — Zachary K Huson
(74) *Attorney, Agent, or Firm* — Quarles & Brady LLP

(57) ABSTRACT

In some examples, an electronic device includes an image sensor and a processor. The processor is to receive an image from the image sensor, identify multiple elements depicted in the image, and determine, based on the multiple elements identified, an environment. The processor is to retrieve a configuration profile associated with the environment and configure, according to a setting of the configuration profile, a peripheral device, an application, or a combination thereof.

15 Claims, 5 Drawing Sheets

CONFIGURATION PROFILES

BACKGROUND

Electronic devices such as desktops, laptops, notebooks, tablets, smartphones, and mobile devices include peripheral devices, applications (e.g., machine-readable instructions that enable users to perform tasks), or a combination thereof, having configurable settings. The peripheral devices include audio devices (e.g., microphones, headsets, speakers), image sensors, display devices, privacy screens, network connections, or a combination thereof. The settings adjust all of or a portion of preferences associated with the peripheral devices, applications, or a combination thereof. The preferences include access to the peripheral devices, applications, or a combination thereof, as well as other parameters that affect operations of the peripheral devices, the applications, or a combination thereof.

BRIEF DESCRIPTION OF THE DRAWINGS

Various examples are described below referring to the following figures.

DETAILED DESCRIPTION

Figure 1A:
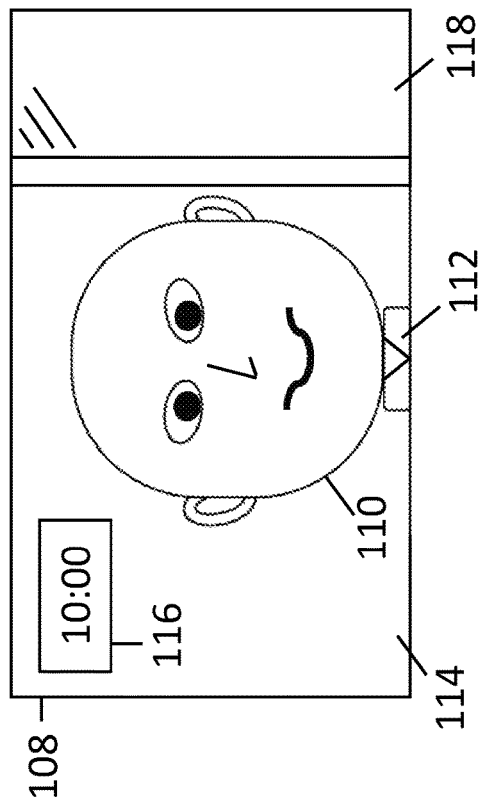
FIGS. 1A-1D are images depicting environments of an electronic device that includes configuration profiles, in accordance with various examples.

As described above, electronic devices include peripheral devices, applications, or a combination thereof, having settings that adjust access to the peripheral devices, the applications, or a combination thereof, as well as other parameters that affect operations of the peripheral devices, the applications, or a combination thereof. A peripheral device, as used herein, is a hardware device that enables sending or receiving of data from an electronic device to which the hardware device is coupled. The peripheral device may be internal or external to the electronic device. An application, as used herein, is machine-readable instructions that enable users to perform tasks (e.g., videoconferencing, live streaming, word processing, video streaming). The settings are adjustable based on an environment of the electronic device, for instance. The parameters include a volume level, a visibility level, availability of a feature, or a combination thereof, for instance.

The environment, as used herein, refers to a physical environment in which the electronic device is located. Due to security reasons associated with the environment, availability of peripheral devices, or a combination thereof, a user adjusts the settings of the peripheral devices, the applications, or a combination thereof, for instance. The settings enable multiple configurations. For instance, in an office environment, an internal image sensor and an internal microphone are enabled while in a home environment, an external image sensor, an external speaker, and a headset are enabled. The settings may be adjusted at the system level through the operating system (OS) (e.g., machine-readable instructions that manage hardware components and applications of the electronic device) or at an application level. At the system level, the settings are applied regardless of which application is utilized. At the application level, the appearance and location of icons (e.g., graphical user interface (GUI) elements generated by machine-readable instructions) to adjust settings may vary. Having various methods with differing locations of icons for adjusting settings is confusing for the user and diminishes the user experience, and in instances where the user engages with an audience (e.g., videoconferencing, video calling, live streaming), diminishes the audience experience.

To automate adjusting settings, an electronic device enables different configuration profiles of multiple configuration profiles. A configuration profile of the multiple configuration profiles includes settings for the peripheral devices, the applications, or a combination thereof, of the electronic device and an environment associated with the settings. The electronic device receives an image from an image sensor and analyzes the image to identify elements depicted in the image. The electronic device utilizes the elements identified in the image to determine an environment within which the electronic device is located. The electronic device enables a configuration profile of the multiple configuration profiles associated with the environment. Enabling the configuration profile associated with the environment adjusts settings of peripheral devices, applications, or a combination thereof, according to the settings of the configuration profile. For example, a first configuration profile is associated with an office environment and has a first setting that enables an internal image sensor and a second setting that enables an internal microphone. Responsive to the electronic device determining that elements depicted in an image indicate the office environment, the electronic device enables the internal image sensor and the internal microphone. A second configuration profile is associated with a home environment and has a first setting that enables an external image sensor and a second setting that enables a headset. Responsive to the electronic device determining that elements depicted in an image indicate the home environment, the electronic device enables the external image sensor and the headset. In some examples, the electronic device receives an audio signal from a microphone and analyzes the audio file to determine the environment. In various examples, a user adjusts the settings, the environment, or a combination thereof, associated with a configuration profile. The user utilizes a graphical user interface (GUI) to adjust the settings, the environment, or a combination thereof, for example.

By automatically adjusting settings according to the configuration profiles, the electronic device enhances the user and the audience experience because the electronic device is able to adjust settings of peripheral devices, applications, or a combination thereof, based on the environment of the electronic device. In some examples, the configuration profiles enable enhanced security by enabling privacy settings of peripheral devices, applications, or a combination thereof, or by disabling access to peripheral devices, applications, or a combination thereof, responsive to the environment of the electronic device.

In some examples in accordance with the present description, an electronic device is provided. The electronic device includes an image sensor and a processor. The processor receives an image from the image sensor, identifies multiple elements depicted in the image, and determines, based on the multiple elements identified, an environment. The processor retrieves a configuration profile associated with the environment and configures, according to a setting of the configuration profile, a peripheral device, an application, or a combination thereof.

In other examples in accordance with the present description, an electronic device is provided. The electronic device includes an image sensor, a storage device storing a first and a second configuration profile, and a processor. The first configuration profile includes a first setting and is associated with a first environment and the second configuration profile includes a second setting and is associated with a second environment. The processor receives an image from the image sensor and identifies an element depicted in the image. In response to the first environment including the element and the second environment excluding the element, the processor configures a peripheral device, an application, or a combination thereof, according to the first setting. In response to the second environment including the element and the first environment excluding the element, the processor configures the peripheral device, the application, or a combination thereof, according to the second setting.

In yet other examples in accordance with the present description, a non-transitory machine-readable medium is provided. The term "non-transitory" does not encompass transitory propagating signals. The non-transitory machine-readable medium stores machine-readable instructions which, when executed by a processor of an electronic device, cause the processor to receive an image from an image sensor, identify multiple elements depicted in the image, determine multiple environments include the multiple elements, and cause a display device to display a GUI. The GUI includes a first configuration profile associated with a first environment of the multiple environments and a second configuration profile associated with a second environment of the multiple environments. The machine-readable instructions, when executed by the processor, cause the processor to, responsive to a selection of the first configuration profile, configure a peripheral device, an application, or a combination thereof, according to a first setting of the first configuration profile, and responsive to a selection of the second configuration profile, configure the peripheral device, the application, or a combination thereof, according to a second setting of the second configuration profile.

Figure 1B:
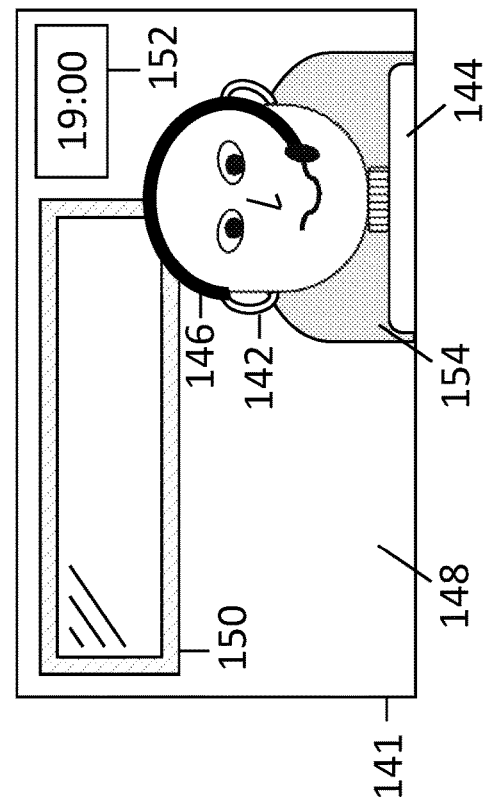
Figure 1C:
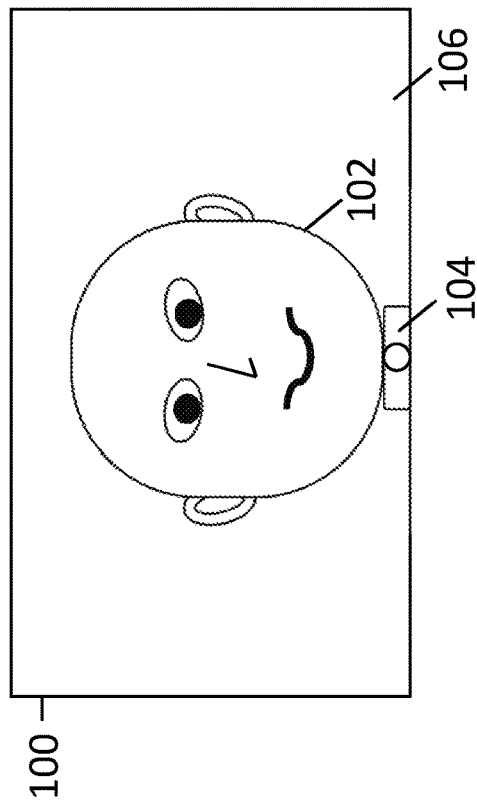
Figure 1D:
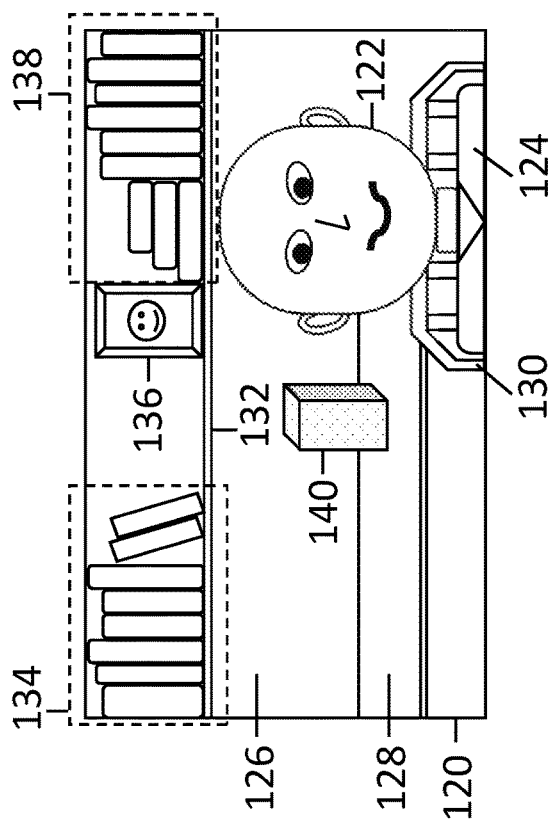

Referring now to FIGS. 1A-1D, images 100, 108, 120, 141 of environments of an electronic device (e.g., the electronic device 300, 400, 500 described below with respect to FIGS. 3, 4, 5, respectively) that includes configuration profiles are depicted, in accordance with various examples. The images 100, 108, 120, 141 are captured by an image sensor of the electronic device, for example. FIG. 1A includes an image 100. The image 100 depicts an element 102, 104, 106. The element 102 is a user, the element 104 is clothing, and the element 106 is a wall, for example. FIG. 1B includes an image 108. The image 108 depicts an element 110, 112, 114, 116, 118. The element 110 is a user, the element 112 is clothing, the element 114 is a wall, the element 116 is a clock, and the element 118 is a window, for example. FIG. 1C includes an image 120. The image 120 depicts an element 122, 124, 126, 128, 130, 132, 134, 136, 138, 140. The element 122 is a user, the element 124 is clothing, the element 126 is a wall, the element 128 is a table, the element 130 is a chair, the element 132 is a shelf, the elements 134, 138 are sets of books, the element 136 is a picture, and the element 140 is a speaker. FIG. 1D includes an image 141. The image 141 depicts an element 142, 144, 146, 148, 150, 152, 154. The element 142 is a user, the element 144 is clothing, the element 146 is a headset, the element 148 is a wall, the element 150 is a window, the element 152 is a clock, and the element 154 is a chair.

In some examples, the user represented by the element 102 is the user represented by the element 110, 122, 142. In other examples, the user represented by the element 102 is the user represented by the element 110 and is a different user than the user represented by the element 122, 142. For example, the electronic device is a shared electronic device and the user represented by the element 102 is a first user, the user represented by the element 122 is a second user, and the user represented by the element 142 is a third user. In some examples, the clock represented by the element 116 is the clock represented by the element 122, and the wall represented by the element 114 is the wall represented by the element 148. For example, the image 108 captures a first environment that is a first location of a room and the image 141 captures a second environment that is a second location of the room.

As described above, the electronic device receives the images 100, 108, 120, 141 from the image sensor and analyzes the images 100, 108, 120, 141 to identify elements 102, 104, 106; 110, 112, 114, 116, 118; 122, 124, 126, 128, 130, 132, 134, 136, 138, 140; 142, 144, 146, 148, 150, 152, 154, respectively, depicted in the images 100, 108, 120, 141. In some examples, the image sensor captures the image responsive to a user launching an application (e.g., video-conferencing, live streaming, video calling). In other examples, the image sensor captures the image responsive to a modification of a network connection. In yet other examples, the image sensor captures the image responsive to the electronic device powering on or waking from a sleep state. The electronic device identifies the elements 102, 104, 106, 110, 112, 114, 116, 118, 122, 124, 126, 128, 130, 132, 134, 136, 138, 140, 142, 144, 146, 148, 150, 152, 154 utilizing image processing techniques, machine learning techniques, or a combination thereof, for example. In some examples, the electronic device utilizes image processing techniques to analyze the images 100, 108, 120, 141 to identify the elements 102, 104, 106; 110, 112, 114, 116, 118; 122, 124, 126, 128, 130, 132, 134, 136, 138, 140; 142, 144, 146, 148, 150, 152, 154, respectively. For example, the electronic device decomposes the images 100, 108, 120, 141 to identify the elements 102, 104, 106; 110, 112, 114, 116, 118; 122, 124, 126, 128, 130, 132, 134, 136, 138, 140; 142, 144, 146, 148, 150, 152, 154, respectively. The image processing techniques include grayscaling, blurring, thresholding, dilating, erosion, or a combination thereof. For example, the electronic device converts the images 100, 108, 120, 141 to a grayscale image. The grayscale image has color removed to enhance the elements 102, 104, 106; 110, 112, 114, 116, 118; 122, 124, 126, 128, 130, 132, 134, 136, 138, 140; 142, 144, 146, 148, 150, 152, 154 of the images 100, 108, 120, 141, respectively. The electronic device blurs the grayscale image to remove noise. The electronic device thresholds the blurred image to convert the blurred image into pixels that are either black or white.

In various examples, the electronic device determines that the white pixels indicate the elements 102, 104, 106; 110, 112, 114, 116, 118; 122, 124, 126, 128, 130, 132, 134, 136, 138, 140; 142, 144, 146, 148, 150, 152, 154 of the images 100, 108, 120, 141, respectively. In various examples, responsive to the decomposed image including multiple elements (e.g., the elements 102, 104, 106 of the image 100; the elements 110, 112, 114, 116, 118 of the image 108; the elements 122, 124, 126, 128, 130, 132, 134, 136, 138, 140 of the image 120; the elements 142, 144, 146, 148, 150, 152, 154 of the image 141), the electronic device determines that a first subset of the multiple elements represents a first element and a second subset of the multiple elements represents a second element by identifying connected subsets of the multiple elements. A connected subset of the multiple elements, as used herein, is a group of pixels of the decomposed image having a same value (e.g., a same color) and that touch in a contiguous manner to form an outline. In various examples, the electronic device dilates (e.g., add pixels to), erodes (e.g., remove pixels from), or a combination thereof, the thresholded image to enhance the element 102, 104, 106; 110, 112, 114, 116, 118; 122, 124, 126, 128, 130, 132, 134, 136, 138, 140; 142, 144, 146, 148, 150, 152, 154 of the image 100, 108, 120, 141, respectively, for identification.

In some examples, the electronic device utilizes a machine learning technique such as a convolutional neural network (CNN) to analyze the images 100, 108, 120, 141 to identify the elements 102, 104, 106; 110, 112, 114, 116, 118; 122, 124, 126, 128, 130, 132, 134, 136, 138, 140; 142, 144, 146, 148, 150, 152, 154, respectively. For example, the electronic device utilizes a region-based CNN (R-CNN). The electronic device divides the images 100, 108, 120, 141 into multiple regions. In various examples, the electronic device utilizes a Region Proposal Network (RPN) to determine the multiple regions. The electronic device inputs the multiple regions into the R-CNN to detect the elements 102, 104, 106; 110, 112, 114, 116, 118; 122, 124, 126, 128, 130, 132, 134, 136, 138, 140; 142, 144, 146, 148, 150, 152, 154, respectively.

In various examples, the electronic device utilizes a computer vision technique to identify the elements 102, 104, 106; 110, 112, 114, 116, 118; 122, 124,126, 128, 130, 132, 134, 136, 138, 140; 142, 144, 146, 148, 150, 152, 154 of the images 100, 108, 120, 141, respectively. The computer vision techniques utilize machine learning networks (e.g., CNN, R-CNN) trained with data sets including a wide variety of elements located within a wide variety of environments. The computer vision techniques include object detection, semantic segmentation, instance segmentation, or a combination thereof. For example, the electronic device utilizes panoptic segmentation, which is a combination of semantic and instance segmentation. Utilizing semantic segmentation, the electronic device categorizes the elements 102, 104, 106; 110, 112, 114, 116, 118; 122, 124, 126, 128, 130, 132, 134, 136, 138, 140; 142, 144, 146, 148, 150, 152, 154 into classes. Utilizing instance segmentation, the electronic device identifies individual elements within the classes. For example, utilizing panoptic segmentation, the electronic device analyzes the image 120 and identifies the elements 134, 138 as the sets of books. The electronic device determines that the elements 134, 138 include multiple elements and that each element of the multiple elements is an individual book. In various examples, the sets of books indicate a class and the individual elements indicate a label associated with the class. For example, the individual book title is a label associated with the set of books.

Figure 2:
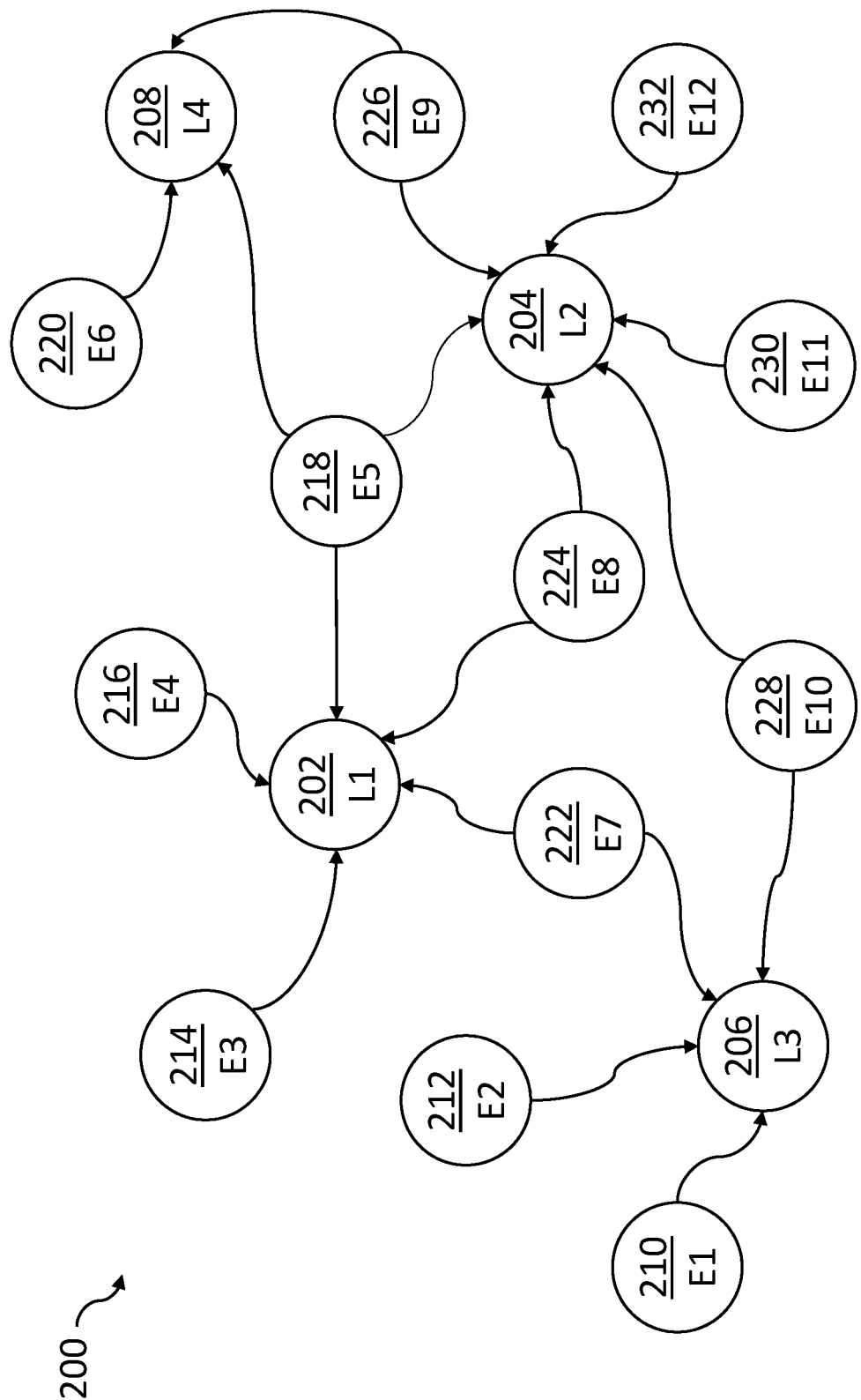
FIG. 2 is a flow diagram depicting elements of environments of an electronic device that includes configuration profiles, in accordance with various examples.

Referring now to FIG. 2, a flow diagram 200 for an electronic device (e.g., the electronic device 300, 400, 500 described below with respect to FIGS. 3, 4, 5, respectively) that includes configuration profiles is depicted, in accordance with various examples. The flow diagram 200 includes elements 210, 212, 214, 216, 218, 220, 222, 224, 226, 228, 230, 232 (e.g., the elements 102, 104, 106, 110, 112, 114, 116, 118, 122, 124, 126, 128, 130, 132, 134, 136, 138, 140, 142, 144, 146, 148, 150, 152, 154) and environments 202, 204, 206, 208. The elements 210, 212, 214, 216, 218, 220, 222, 224, 226, 228, 230, 232 are herein collectively referred to as the elements 210-232. The flow diagram 200 is a graphical representation that shows the relationships between the elements 210-232 and the environments 202, 204, 206, 208. The environment 202 indicates a first environment L1 (e.g., an environment captured by the image 141). The environment 204 indicates a second environment L2 (e.g., an environment captured by the image 120). The environment 206 indicates a third environment L3 (e.g., an environment captured by the image 108). The environment 208 indicates a fourth environment L4 (e.g., an environment captured by the image 100). The environment 202 is associated with the elements 214, 216, 218, 222, 224. The environment 204 is associated with the elements 218, 224, 226, 228, 230, 232. The environment 206 is associated with the elements 210, 212, 222, 228. The environment 208 is associated with the elements 218, 220, 226.

The flow diagram 200 is a graphical representation of a data structure (e.g., linked list, database, hash table, arrays, heaps, graphs, trees) storing the relationships between the elements 210-232 and the environments 202, 204, 206, 208, for example. In some examples, the data structure is stored to a storage device of the electronic device, as shown and described below with respect to FIG. 4. In other examples, the data structure is stored to a remote storage device communicatively coupled to the electronic device, as shown and described below with respect to FIG. 3. The remote storage device is communicatively coupled to the electronic device via a network connection, for example.

The elements 210-232 include classes, labels, identifiers, audio files or characteristics of audio files, or a combination thereof. The characteristics of an audio file include an amplitude, a frequency, a background noise, a bandwidth, a power level, or any other measurable characteristic. In some examples, the elements 210-232 include an identifier of a user or identifiers of multiple users, an identifier of an electronic device or identifiers of multiple electronic devices, an identifier of a network connection or identifiers of multiple network connections, an identifier of an application or identifiers of multiple applications, an identifier of a peripheral device or identifiers of multiple peripheral devices, or a combination thereof. In various examples, the identifier of a user of the multiple users, the identifier of an electronic device of the multiple electronic devices, the identifier of a network connection of the multiple network connections, the identifier of an application of the multiple applications, the identifier of a peripheral device of the multiple peripheral devices, or a combination thereof, is associated with multiple configuration profiles.

As described above, the electronic device utilizes the elements 210-232 identified from the image (e.g., the image 100, 108, 120, 141) to determine an environment 202, 204, 206, 208 within which the electronic device is located. For example, utilizing the techniques described above with respect to FIG. 1, the electronic device analyzes the image and identifies the elements 214, 216, 218, 222, 224. The electronic device determines that the elements 214, 216, 218, 222, 224 are associated with the environment 202 and that the electronic device is located in the environment 202. In another example, utilizing the techniques described above with respect to FIG. 1, the electronic device analyzes the image and identifies the elements 218, 224. The electronic device determines that the elements 218, 224 are associated with the environments 202, 204. In some examples, as described above, the electronic device receives an audio signal from a microphone and analyzes the audio file to determine whether the electronic device is located in the environment 202 or the environment 204. For example, the electronic device analyzes frequency differences in different portions of the audio signal, patterns of energy concentration across the different portions of the audio signal, differences between energy concentration patterns of the different portions of the audio signal, or a combination thereof. In some examples, based on the analysis of the audio signal, the electronic device determines that the audio signal indicates the user is located in an environment having no background noise. The electronic device determines whether other elements of the environments 202, 204 are elements that indicate no background noise. For example, responsive to the electronic device determining that the element 216 associated with the environment 202 indicates no background noise and that none of the elements 226, 228, 230, 232 associated with the environment 204 indicate no background noise, the electronic device determines that the electronic device is located in the environment 202.

In other examples, to determine whether the electronic device is located in the environment 202 or the environment 204, the electronic device determines whether the elements 218, 224 indicate classes, as described above with respect to FIG. 1. Responsive to a determination that the element 218 indicates a class, the electronic device determines whether the image includes a label associated with the class, for example. In some examples, the flow diagram 200 includes additional elements (not explicitly shown) that are associated with an element of the elements 210-232 and an environment of the environments 202, 204, 206, 208. In other examples, the flow diagram 200 includes a second layer of elements (not explicitly shown) that include labels associated with elements that indicate classes and an environment of the environments 202, 204, 206, 208. The electronic device determines whether the image depicts an element that is associated with a label. For example, the element 218 indicates clothing (e.g., the elements 104, 112, 124, 144). The electronic device determines that the image includes clothing that is associated with a "tie" label (e.g., the element 112). Responsive to a determination that the image includes the element that is associated with the label, the electronic device determines the environment (e.g., the environment of the image 108) based on the environment associated with the label.

In various examples, the environments 202, 204, 206, 208 correspond to a first configuration profile of multiple configuration profiles, a second configuration profile of multiple configuration profiles, a third configuration profile of multiple configuration profiles, and a fourth configuration profile of multiple configuration profiles, respectively. The first configuration profile includes a first group of settings, the second configuration profile includes a second group of settings, the third configuration profile includes a third group of settings, and a fourth configuration profile includes a fourth group of settings. A group of settings, as used herein, may include an individual setting or multiple settings. As described above, the settings of the configuration profile indicate that the electronic device is to adjust all or a portion of preferences associated with the peripheral devices, applications, or a combination thereof. The preferences include access to the peripheral devices, applications, or a combination thereof, as well as other parameters that effect operations of the peripheral devices, the applications, or a combination thereof. For example, the settings indicate whether to mute or unmute a microphone, whether to enable or disable the microphone, whether to enable or disable an external speaker, a level of brightness of a display device, a volume level of the microphone, a volume level of the headset, a volume level of a speaker, whether to enable or disable an application or a portion of a functionality of the application, whether to enable or disable a privacy screen, whether to enable or disable a network connection, or a combination thereof. In another example, a setting is associated with an application and indicates that the electronic device is to cause a display device to display a GUI of an application, where the GUI includes a subset of multiple options, the subset indicated by the setting. In yet another example, a setting is associated with a text-to-speech application and indicates that electronic device is to cause the text-to-speech application to filter out words or phrases not associated with the environment.

Figure 3:
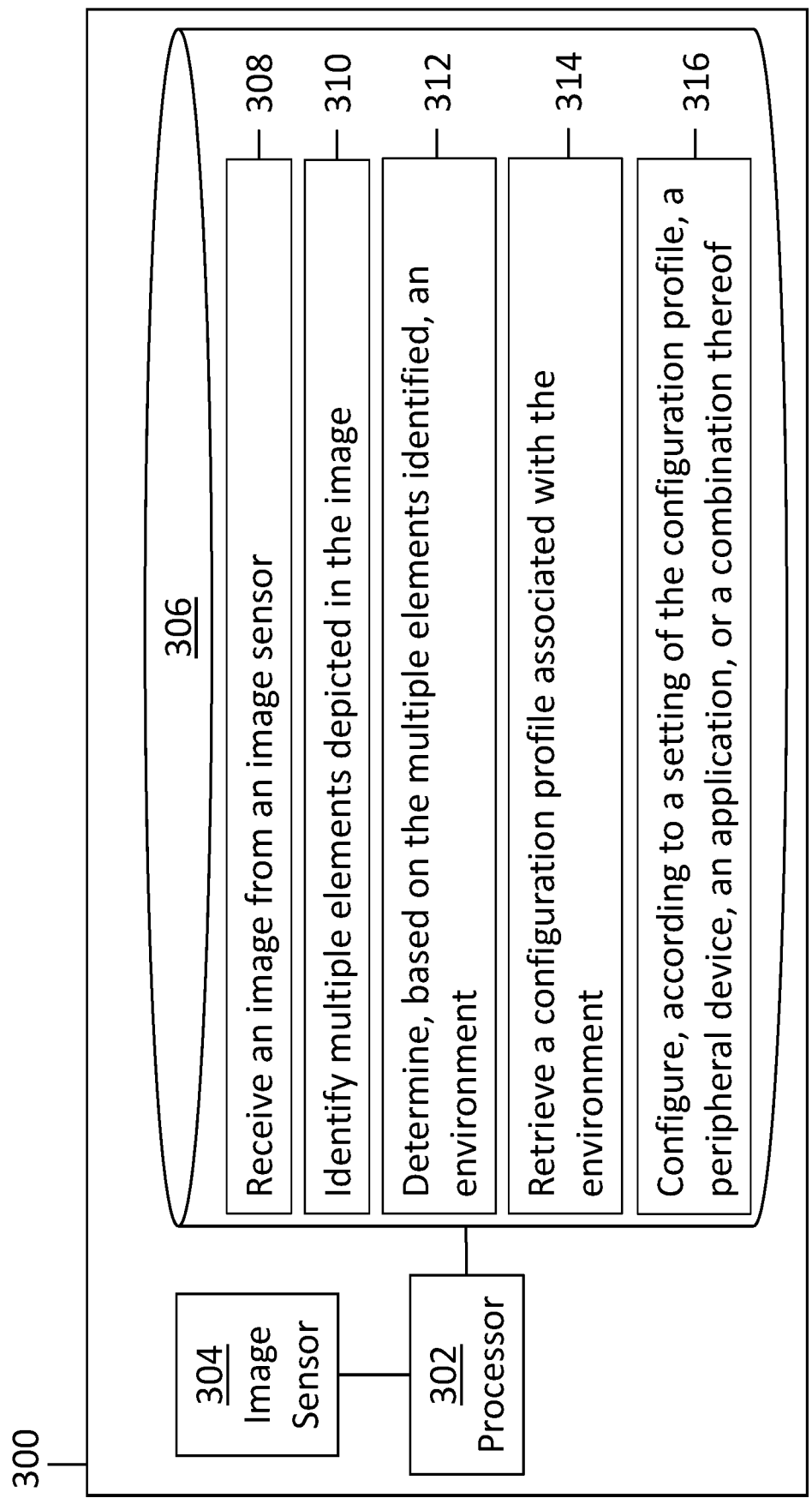
FIG. 3 is a block diagram depicting an electronic device for adjusting settings based on configuration profiles, in accordance with various examples.

Referring now to FIG. 3, a block diagram of an electronic device 300 for adjusting settings based on configuration profiles is depicted, in accordance with various examples. The electronic device 300 is a desktop, a laptop, a notebook, a tablet, a smartphone, or any other suitable computing device that interacts with peripheral devices, applications, or a combination thereof, for example. The electronic device 300 includes a processor 302, an image sensor 304, and a storage device 306. The processor 302 is a microprocessor, a microcomputer, a microcontroller, a programmable integrated circuit, a programmable gate array, or another suitable processor or controller for managing operations of the electronic device 300. The processor 302 is a central processing unit (CPU), a graphics processing unit (GPU), a system on a chip (SoC), an image signal processor (ISP), or a field programmable gate array (FPGA), for example. The image sensor 304 is an internal camera, an external camera, or any other suitable device for capturing an image (e.g., the image 100, 108, 120, 141), recording a video signal, or a combination thereof. The storage device 306 is a hard drive, a solid state drive (SSD), flash memory, random access memory (RAM), or other suitable memory for storing data or machine-readable instructions of the electronic device 300.

While not explicitly shown, the electronic device 300 includes network interfaces, video adapters, sound cards, local buses, peripheral devices (e.g., a keyboard, a mouse, a touchpad, a speaker, a microphone, a display device, a privacy screen), wireless transceivers, connectors, or a combination thereof. While the image sensor 304 is shown as an integrated image sensor of the electronic device 300, in other examples, the image sensor 304 couples to any suitable connection for enabling communications between the electronic device 300 and the image sensor 304. The connection may be via a wired connection (e.g., a Universal Serial Bus (USB)) or via a wireless connection (e.g., BLUETOOTH®, WI-FI®). In some examples, the processor 302, the image sensor 304, the storage device 306, or a combination thereof, are located within an integrated circuit such as an embedded artificial intelligence (eAI) chip.

In some examples, the processor 302 couples to the image sensor 304 and the storage device 306. The storage device 306 stores machine-readable instructions, which, when executed, cause the processor 302 to perform some or all of the actions attributed herein to the processor 302. The machine-readable instructions are the machine-readable instructions 308, 310, 312, 314, 316.

In various examples, the machine-readable instructions 308, 310, 312, 314, 316 cause the processor 302 to adjust settings based on configuration profiles. The machine-readable instruction 308, when executed by the processor 302, causes the processor 302 to receive the image from the image sensor 304. The machine-readable instruction 310, when executed by the processor 302, causes the processor 302 to identify multiple elements (e.g., the elements 102, 104, 106; the elements 110, 112, 114, 116, 118; the elements 122, 124, 126, 128, 130, 132, 134, 136, 138, 140; the elements 142, 144, 146, 148, 150, 152, 154) depicted in the image. The processor 302 identifies the multiple elements depicted in the image utilizing the techniques described above with respect to FIG. 1, for example. The machine-readable instruction 312, when executed by the processor 302, causes the processor 302 to determine, based on the multiple elements identified, an environment (e.g., the environment 202, 204, 206, 208). The processor 302 determines the environment utilizing the techniques described above with respect to FIG. 2, for example. The machine-readable instruction 314, when executed by the processor 302, causes the processor 302 to retrieve a configuration profile associated with the environment. The machine-readable instruction 316, when executed by the processor 302, causes the processor 302 to configure, according to a setting of the configuration profile, a peripheral device, an application, or a combination thereof.

In some examples, the configuration profile is stored on a storage device of the electronic device 300, as shown and described below with respect to FIG. 4. In other examples, a remote storage device (not explicitly shown) stores the configuration profile. The remote storage device is a remotely managed storage device such as an enterprise cloud, a public cloud, a data center, a server farm, or some other suitable remotely managed storage device, for example. The electronic device accesses the remote storage device via a network connection (not explicitly shown), for example. To retrieve the configuration profile associated with the environment, the processor 302 causes a transmission that includes the environment determined by executing the machine-readable instruction 312 to the remote storage device. The processor 302 receives a transmission that includes the configuration profile associated with the environment from the remote storage device.

As described above, the electronic device 300 enables different configuration profiles of multiple configuration profiles, where a configuration profile of the multiple configuration profiles includes settings for the peripheral devices, the applications, or a combination thereof, of the electronic device 300. In various examples, responsive to receipt of the transmission from the remote storage device, the processor 302 configures, according to a setting the configuration profile associated with the environment, a peripheral device, an application, or a combination thereof. For example, the image sensor 304 is the peripheral device, and the setting of the configuration profile associated with the environment, indicates that the processor 302 is to disable the image sensor 304. In various examples, the configuration profile associated with the environment includes another setting for another peripheral device, another application, or a combination thereof. For example, another setting of the configuration profile associated with the environment indicates that the processor 302 is to enable an external image sensor (not explicitly shown).

As described above, the environment associated with the configuration profile is associated with an element that is an identifier of a user. In some examples, the processor 302 determines the identifier of the user utilizing the electronic device 300. For example, the processor 302 utilizes facial recognition techniques to identify a user of the electronic device 300 and determines the identifier of the user based on the identification. The processor 302 retrieves the configuration profile associated with the environment and the identifier of the user utilizing the electronic device 300. The processor 302 configures, according to a setting of the configuration profile associated with the environment and the identifier of the user utilizing the electronic device 300, a peripheral device, an application, or a combination thereof. For example, a living room environment is associated with a first user and a second user. The first user utilizes a first volume for a speaker, and the second user utilizes a second volume for the speaker. In some examples, the second volume is different than the first volume. The processor 302 determines that the identifier of the first user is utilized to access the electronic device 300. The processor 302 retrieves the configuration profile associated with the environment and the identifier of the first user. The processor 302 configures the speaker according to the setting of the configuration profile that is associated with the identifier of the first user.

As described above, the environment associated with the configuration profile is associated with an element that is an identifier of an electronic device. In some examples, the processor 302 determines the identifier of the electronic device 300. The processor 302 retrieves the configuration profile associated with the environment and the identifier of the electronic device 300. The processor 302 configures, according to a setting of the configuration profile associated with the environment and the identifier of the electronic device 300, a peripheral device, an application, or a combination thereof. For example, a public environment (e.g., a coffee shop, a library) is associated with a first electronic device and a second electronic device. The first electronic device utilizes a headset and an internal image sensor, and the second electronic device utilizes the headset and disables the internal image sensor. The processor 302 determines that the identifier of the electronic device 300 indicates the second electronic device. The processor 302 retrieves the configuration profile associated with the public environment and the second electronic device. The processor 302 configures the internal image sensor according to the setting of the configuration profile that is associated with the environment and the second electronic device.

Figure 4:
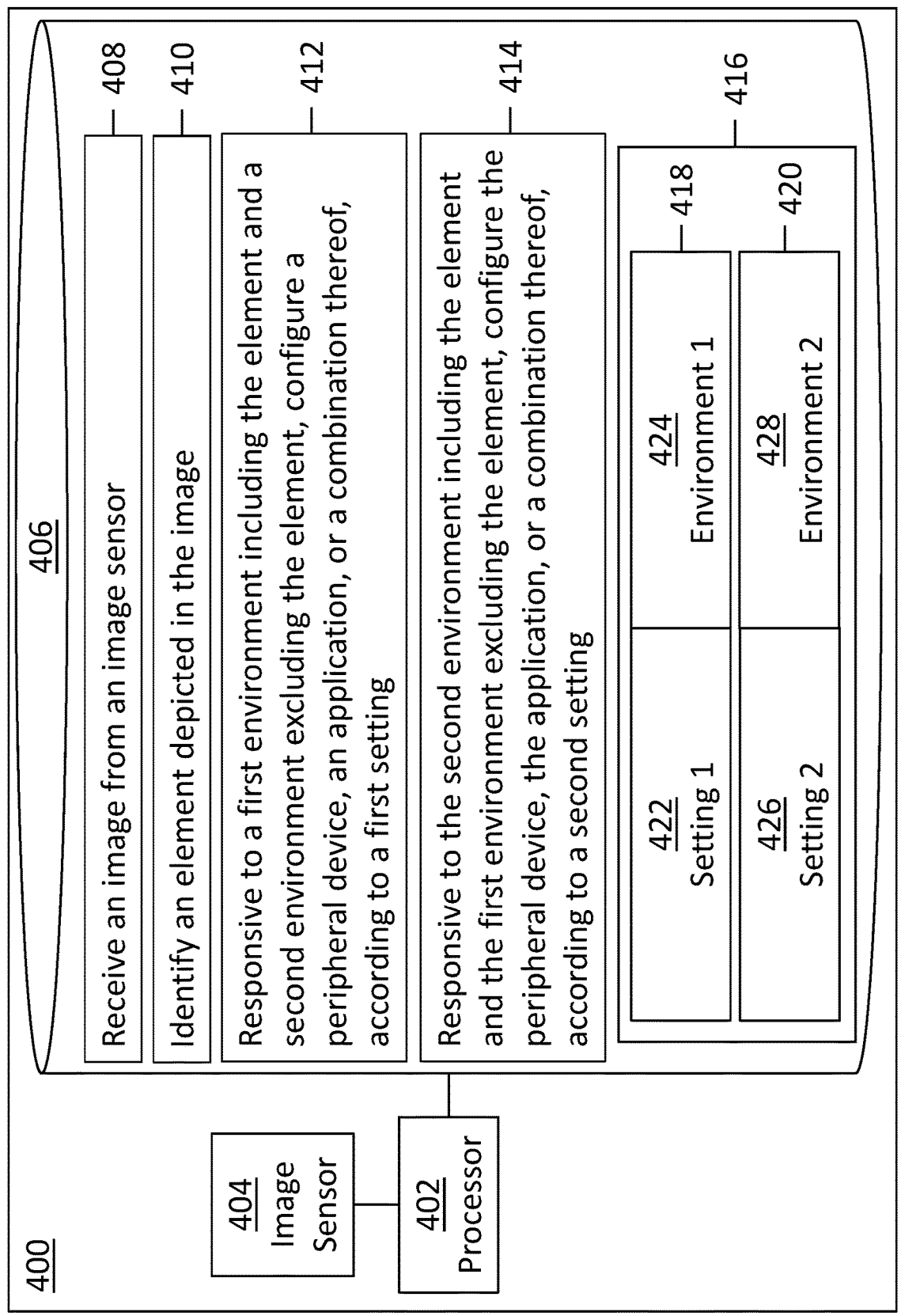
FIG. 4 is a block diagram depicting an electronic device for adjusting settings based on configuration profiles, in accordance with various examples.

Referring now to FIG. 4, a block diagram depicting an electronic device 400 for adjusting settings based on configuration profiles 416 is depicted, in accordance with various examples. The electronic device 400 is the electronic device 300, for example. The electronic device 400 includes a processor 402, an image sensor 404, and a storage device 406. The processor 402 is the processor 302, for example. The image sensor 404 is the image sensor 304, for example. The storage device 406 is the storage device 306, for example.

In some examples, the processor 402 couples to the image sensor 404 and the storage device 406. The storage device 406 stores machine-readable instructions, which, when executed, cause the processor 402 to perform some or all of the actions attributed herein to the processor 402. The machine-readable instructions are the machine-readable instructions 408, 410, 412, 414. The storage device 406 stores the configuration profiles 416. The configuration profiles 416 include a configuration profile 418, 420. The configuration profile 418 includes a setting 422 and is associated with an environment 424. The configuration profile 420 includes a setting 426 and is associated with an environment 428.

In various examples, the machine-readable instructions 408, 410, 412, 414 cause the processor 402 to adjust settings based on the configuration profiles 416. The machine-readable instruction 408, when executed by the processor 402, causes the processor 402 to receive an image (e.g., the image 100, 108, 120, 141) from the image sensor 404. The machine-readable instruction 410, when executed by the processor 402, causes the processor 402 to identify an element (e.g., the element 102, 104, 106, 110, 112, 114, 116, 118, 122, 124, 126, 128, 130, 132, 134, 136, 138, 140, 142, 144, 146, 148, 150, 152, 154) depicted in the image. To identify the element, the processor 402 utilizes the techniques described above with respect to FIG. 2, for example. In response to the first environment including the element and the second environment excluding the element, the machine-readable instruction 412, when executed by the processor 402, causes the processor 402 to configure a peripheral device, an application, or a combination thereof, according to the first setting. The processor 402 determines whether the element is associated with the first environment, the second environment, or a combination thereof, utilizing the techniques described above with respect to FIG. 2, for example. In response to the second environment including the element and the first environment excluding the element, the machine-readable instruction 414, when executed by the processor 402, causes the processor 402 to configure the peripheral device, the application, or a combination thereof, according to the second setting.

In some examples, the processor 402, in response to the first environment and the second environment excluding the element, stores a third configuration profile to the storage device 406. The third configuration profile includes a third setting to configure the peripheral device, the application, or a combination thereof, and is associated with a third environment that includes the element. In other examples, in response to the first environment and the second environment including the element, the processor 402 identifies another element depicted in the image. In response to the first environment including the another element and the second environment excluding the another element, the processor 402 configures a peripheral device, an application, or a combination thereof, according to the first setting. In response to the second environment including the another element and the first environment excluding the another element, the processor 402 configures the peripheral device, the application, or a combination thereof, according to the second setting. In response to the first environment and the second environment excluding the element and the another element, the processor 402 stores a third configuration profile to the storage device 406. The third configuration profile includes a third setting to configure the peripheral device, the application, or a combination thereof, and is associated with a third environment that includes the element and the another element.

In various examples, in response to the first environment and the second environment including the element, the processor 402 receives an audio file via a microphone (not explicitly shown). The processor 402 determines the audio file indicates the first environment. The processor 402 determines the audio file indicates the first environment utilizing the techniques described above with respect to FIG. 2, for example. The processor 402 configures the peripheral device, the application, or a combination thereof, according to the first setting of the first configuration profile.

In other examples, in response to an inability to identify an element depicted in the image, the processor 402 receives the audio file via the microphone (not explicitly shown). The processor 402 determines that the audio file indicates the first environment utilizing the techniques described above with respect to FIG. 2, for example. The processor 402 configures the peripheral device, the application, or a combination thereof, according to the first setting of the first configuration profile. In another example, the processor 402 determines that the audio file does not indicate the first or the second environments. In response to the determination that the audio file does not indicate the first or the second environments, the processor 402 stores a third configuration profile to the storage device 406. The third configuration profile includes a third setting to configure the peripheral device, the application, or a combination thereof, and is associated with a third environment that includes the element and the audio file.

Figure 5:
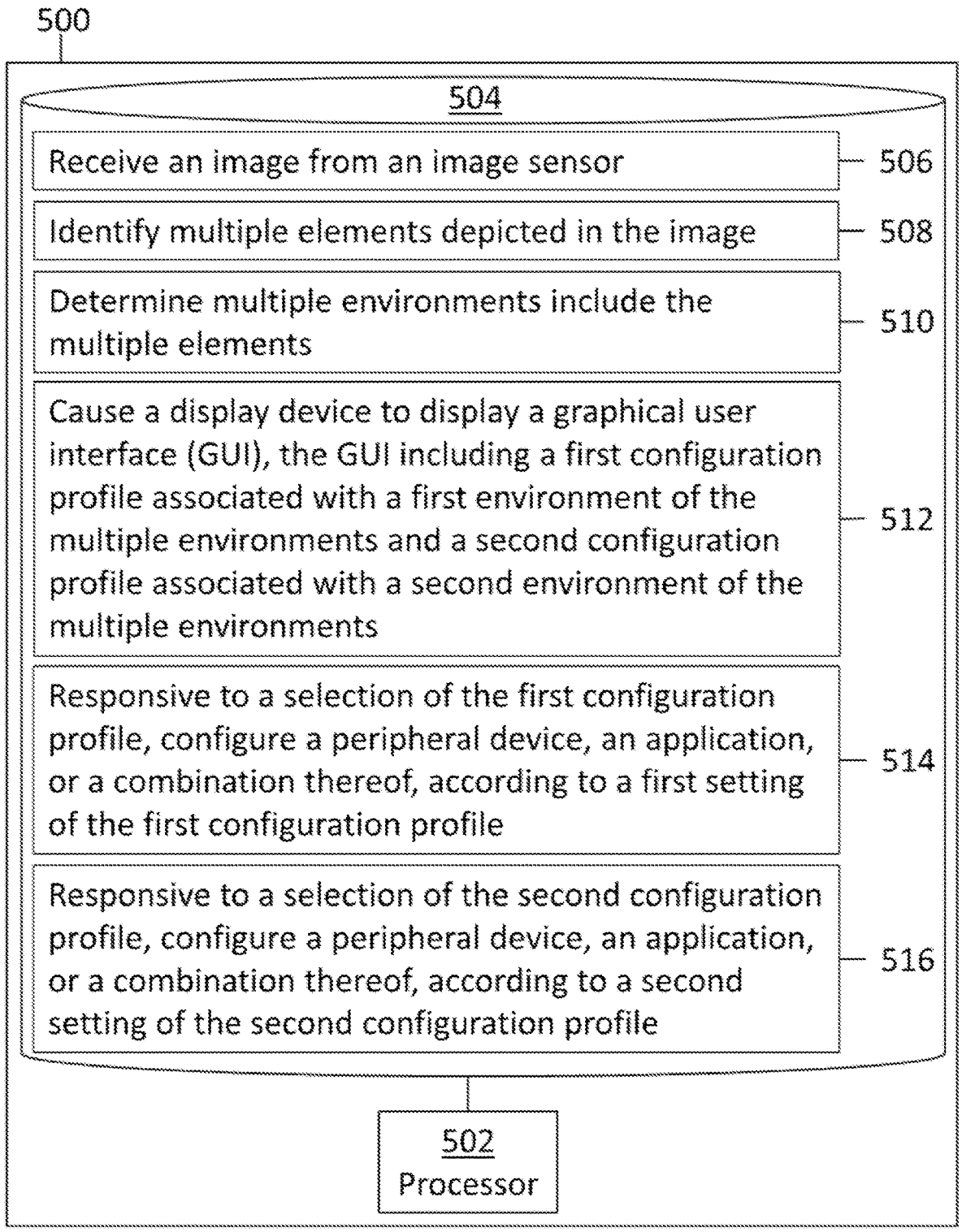
FIG. 5 is a block diagram depicting an electronic device for adjusting settings based on configuration profiles, in accordance with various examples.

Referring now to FIG. 5, a block diagram depicting an electronic device 500 for adjusting settings based on configuration profiles (e.g., the configuration profiles 416) is depicted, in accordance with various examples. The electronic device 500 is the electronic device 300, 400, for example. The electronic device 500 includes a processor 502 and a non-transitory machine-readable medium 504. The processor 502 is the processor 302, 402, for example. The non-transitory machine-readable medium 504 is the storage device 306, 406, for example. The non-transitory machine-readable medium 504 stores machine-readable instructions, which, when executed, cause the processor 502 to perform some or all of the actions attributed herein to the processor 502. The machine-readable instructions are the machine-readable instructions 506, 508, 510, 512, 514, 516.

In various examples, the machine-readable instructions 506, 508, 510, 512, 514, 516 cause the processor 502 to adjust settings based on the configuration profiles. The machine-readable instruction 506, when executed by the processor 502, causes the processor 502 to receive an image (e.g., the image 100, 108, 120, 141) from an image sensor (e.g., the image sensor 304, 404). The machine-readable instruction 508, when executed by the processor 502, causes the processor 502 to identify multiple elements (e.g., the elements 102, 104, 106; the elements 110, 112, 114, 116, 118; the elements 122, 124, 126, 128, 130, 132, 134, 136, 138, 140; the elements 142, 144, 146, 148, 150, 152, 154) depicted in the image. The machine-readable instruction 510, when executed by the processor 502, causes the processor 502 to determine that multiple environments (e.g., the environments 202, 204, 206, 208) include the multiple elements (e.g., the elements 210-232). The processor 502 determines the multiple environments include the multiple elements utilizing the techniques described above with respect to FIG. 2, for example. The machine-readable instruction 512, when executed by the processor 502, causes the processor 502 to cause a display device (not explicitly shown) to display a GUI. The GUI includes a first configuration profile (e.g., the configuration profile 418) associated with a first environment (e.g., the environment 424) of the multiple environments and a second configuration profile (e.g., the configuration profile 420) associated with a second environment (e.g., the environment 428) of the multiple environments. The machine-readable instruction 514, when executed by the processor 502, causes the processor 502 to, responsive to a selection of the first configuration profile, configure a peripheral device, an application, or a combination thereof, according to a first setting (e.g., the setting 422) of the first configuration profile. The machine-readable instruction 516, when executed by the processor 502, causes the processor 502 to, responsive to a selection of the second configuration profile, configure the peripheral device, the application, or a combination thereof, according to a second setting (e.g., the setting 426) of the second configuration profile.

In various examples, the processor 502 determines that the multiple elements are excluded from the multiple environments. In response to the determination that the multiple elements are excluded from the multiple environments, the processor 502 causes the display device to display the GUI to prompt a user to verify that the multiple elements are associated with a third environment. In response to a verification that the multiple elements are associated with the third environment, the processor 502 generates a third configuration profile, the third configuration profile associated with the third environment and including a third setting for the peripheral device, the application, or a combination thereof. In some examples, the processor 502 stores the third configuration profile to the non-transitory machine-readable medium 504. In other examples, the processor 502 causes transmission of the third configuration profile to a remote storage device that stores the configuration profiles.

In some examples, the processor 502 receives another image from the image sensor. The processor 502 identifies another set of multiple elements depicted in the another image. The processor 502 determines that the third environment includes the another set of multiple elements. In response to the determination that the third environment includes the another set of multiple elements, the processor 502 configures the peripheral device, the application, or a combination thereof, according to the third setting of the third configuration profile.

In other examples, the processor 502 determines that the multiple elements are excluded from the multiple environments. The processor 502 determines a class of an element of the multiple elements. The processor 502 causes the display device to display the GUI prompting a user to verify a third environment associated with a third configuration profile, the third environment including the class of the element. In response to a verification of the third environment, the processor 502 configures the peripheral device, the application, or a combination thereof, according to a third setting for the peripheral device, the application, or a combination thereof.

In some examples, in response to a determination that multiple environments include the multiple elements, the processor 502 receives an audio file via a microphone (not explicitly shown). The processor 502 determines that the audio file indicates the first environment. In response to the determination that the audio file indicates the first environment, the processor 502 configures the peripheral device, the application, or a combination thereof, according to the first setting of the first configuration profile.

In various examples, in response to a determination that the multiple elements are excluded from the multiple environments, the processor 502 determines degrees of matching of the multiple elements with the multiple environments. For example, the processor 502 determines that a first environment of the multiple environments include 80% of the multiple elements, a second environment of the multiple environments include 92% of the multiple elements, a third environment of the multiple environments include 10% of the multiple elements, and a fourth environment of the multiple environments include 25% of the multiple environments. In some examples, the processor 502 causes the GUI to display the first configuration profile associated with the first environment and the second configuration profile associated with the second environment.

In other examples, in response to a determination that the multiple elements are excluded from the multiple environments, the processor 502 eliminates a first subset of the multiple elements that are common to the multiple environments. The processor 502 determines degrees of matching of a second subset of the multiple elements with the multiple environments, where the second subset includes the remaining elements of the multiple elements. For example, the processor 502 determines that a first environment of the multiple environments include 10% of the second subset of multiple elements, a second environment of the multiple environments include 50% of the multiple elements, a third environment of the multiple environments include 10% of the multiple elements, and a fourth environment of the multiple environments include 25% of the multiple environments. In some examples, the processor 502 causes the GUI to display the second configuration profile associated with the second environment and the fourth configuration profile associated with the fourth environment.

In some examples, in response to a determination that a peripheral device, an application, or a combination thereof, associated with the first setting of the first configuration profile, the processor 502 causes the GUI to display text that informs the user that the peripheral device, the application, or the combination thereof, is unavailable and prompts the user to couple the peripheral device to the electronic device 500, to select another configuration profile, or a combination thereof. In other examples, the processor 502 configures another peripheral device, another application, or a combination thereof to a default setting. For example, responsive to the first setting indicating that the processor 502 is to enable a headset and a determination that the headset is unavailable, the processor 502 is to enable an internal microphone and an internal speaker.

By detecting elements and determining a degree of matching with environments of the configuration profiles, the electronic device can automatically adjust settings based on the degree of matching. By automatically adjusting the settings according to a configuration profile associated with an environment that has a highest degree of matching with the detected elements, the electronic device enhances the user and the audience experience because the electronic device is able to adjust settings of peripheral devices, applications, or a combination thereof, based on the similarity of the current environment of the electronic device with the environment associated with the configuration profile.

As described herein, the terms "application," "software," and "firmware" are considered to be interchangeable in the context of the examples provided. "Firmware" is considered to be machine-readable instructions that a processor of the electronic device executes prior to execution of the operating system (OS) of the electronic device, with a small portion that continues after the OS bootloader executes (e.g., a callback procedure). "Application" and "software" are considered broader terms than "firmware," and refer to machine-readable instructions that execute after the OS bootloader starts, through OS runtime, and until the electronic device shuts down. "Application," "software," and "firmware," as used herein, are referred to as executable code.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
    an image sensor; and
    a processor to:
        receive an image from the image sensor;
        identify multiple elements depicted in the image;
        determine, based on the multiple elements identified, an environment;
        retrieve a configuration profile associated with the environment; and
        configure, according to a setting of the configuration profile, a peripheral device, an application, or a combination thereof.

2. The electronic device of claim 1, wherein a remote storage device is to store the configuration profile.

3. The electronic device of claim 1, wherein the image sensor is the peripheral device.

4. The electronic device of claim 1, wherein the processor is to identify the multiple elements utilizing panoptic segmentation.

5. The electronic device of claim 1, wherein the configuration profile includes another setting for another peripheral device, another application, or a combination thereof.

6. An electronic device, comprising:
    an image sensor;
    a storage device storing a first and a second configuration profile, the first configuration profile including a first setting and associated with a first environment and the second configuration profile including a second setting and associated with a second environment; and
    a processor to:
        receive an image from the image sensor;
        identify an element depicted in the image;
        in response to the first environment including the element and the second environment excluding the element, configure a peripheral device, an application, or a combination thereof, according to the first setting; and
        in response to the second environment including the element and the first environment excluding the element, configure the peripheral device, the application, or a combination thereof, according to the second setting.

7. The electronic device of claim 6, wherein the processor is to, in response to the first environment and the second environment excluding the element, store a third configuration profile to the storage device, the third configuration profile including a third setting and associated with a third environment, the third setting to configure the peripheral device, the application, or a combination thereof, the third environment including the element.

8. The electronic device of claim 6, wherein, in response to the first environment and the second environment including the element, the processor is to:
    identify another element depicted in the image;
    in response to the first environment including the another element and the second environment excluding the another element, configure a peripheral device, an application, or a combination thereof, according to the first setting; and
    in response to the second environment including the another element and the first environment excluding the another element, configure the peripheral device, the application, or a combination thereof, according to the second setting.

9. The electronic device of claim 8, wherein, in response to the first environment and the second environment excluding the element and the another element, the processor is to store a third configuration profile to the storage device, the third configuration profile including a third setting and associated with a third environment, the third setting to configure the peripheral device, the application, or a combination thereof, the third environment including the element and the another element.

10. The electronic device of claim 6, wherein, in response to the first environment and the second environment including the element, the processor is to:
    receive an audio file via a microphone;
    determine that the audio file indicates the first environment; and
    configure the peripheral device, the application, or a combination thereof, according to the first setting of the first configuration profile.

11. A non-transitory machine-readable medium storing machine-readable instructions which, when executed by a processor of an electronic device, cause the processor to:
    receive an image from an image sensor;
    identify multiple elements depicted in the image;
    determine that multiple environments include the multiple elements;
    in response to the determination that the multiple environments include the multiple elements, cause a display device to display a graphical user interface (GUI), the GUI including a first configuration profile associated with a first environment of the multiple environments and a second configuration profile associated with a second environment of the multiple environments;
    responsive to a selection of the first configuration profile, configure a peripheral device, an application, or a combination thereof, according to a first setting of the first configuration profile; and
    responsive to a selection of the second configuration profile, configure the peripheral device, the application, or a combination thereof, according to a second setting of the second configuration profile.

12. The non-transitory machine-readable medium of claim 11, wherein, in response to a determination that the multiple elements are excluded from the multiple environments, the processor is to:
    cause the display device to display the GUI to prompt a user to verify that the multiple elements are associated with a third environment; and
    in response to a verification that the multiple elements are associated with the third environment, generate a third configuration profile, the third configuration profile associated with the third environment and including a third setting for the peripheral device, the application, or a combination thereof.

13. The non-transitory machine-readable medium of claim 12, wherein the processor is to:
    receive another image from the image sensor;

identify another set of multiple elements depicted in the another image;

determine that the third environment includes the another set of multiple elements; and in response to the determination that the third environment includes the another set of multiple elements, configure the peripheral device, the application, or a combination thereof, according to the third setting of the third configuration profile.

14. The non-transitory machine-readable medium of claim 11, wherein, in response to a determination that the multiple elements are excluded from the multiple environments, the processor is to:

determine a class of an element of the multiple elements;

cause the display device to display the GUI prompting a user to verify a third environment associated with a third configuration profile, the third environment including the class of the element; and in response to a verification of the third environment, configure the peripheral device, the application, or a combination thereof, according to a third setting for the peripheral device, the application, or a combination thereof.

15. The non-transitory machine-readable medium of claim 11, wherein, in response to a determination that the multiple environments include the multiple elements, the processor is to:

receive an audio file via a microphone;

determine that the audio file indicates the first environment; and configure the peripheral device, the application, or a combination thereof, according to the first setting of the first configuration profile.

* * * * *